US011908347B2

(12) United States Patent
Zhao

(10) Patent No.: US 11,908,347 B2
(45) Date of Patent: Feb. 20, 2024

(54) ILLUMINATED DISPLAY FRAME

(71) Applicant: Lei Zhao, Azusa, CA (US)

(72) Inventor: Lei Zhao, Azusa, CA (US)

(*) Notice: Subject to any disclaimer, the term of this patent is extended or adjusted under 35 U.S.C. 154(b) by 53 days.

(21) Appl. No.: 16/401,011

(22) Filed: May 1, 2019

(65) Prior Publication Data

US 2020/0349871 A1 Nov. 5, 2020

(51) Int. Cl.
*G09F 13/04* (2006.01)

(52) U.S. Cl.
CPC ................................ *G09F 13/0413* (2013.01)

(58) Field of Classification Search
CPC ..... G09F 2013/1881; G09F 2013/1877; G09F 2013/1872; G09F 13/0413; G09F 2013/0418; G09F 2013/0445; G09F 2013/049; F21S 4/20; F21S 4/28; F21S 4/24; F21S 4/26; F21V 21/005
See application file for complete search history.

(56) References Cited

U.S. PATENT DOCUMENTS 10,909,890 B1 * 2/2021 Apostle ............... G09F 13/0445

FOREIGN PATENT DOCUMENTS

| | | | | |
|---|---|---|---|---|
| CN | 2914237 Y | * | 6/2007 | |
| CN | 206672576 U | * | 11/2017 | ............ G09F 13/18 |
| CN | 108492735 A | * | 9/2018 | |
| CN | 109473049 A | * | 3/2019 | |
| WO | WO-2018161738 A1 | * | 9/2018 | ............ G09F 13/04 |

* cited by examiner

*Primary Examiner* — Cassandra Davis
(74) *Attorney, Agent, or Firm* — Elizabeth Yang

(57) ABSTRACT

An illuminated display frame includes at least one horizontal supporting frame, wherein each of the horizontal supporting frames comprises a first receiving cavity; at least one transversal supporting frame connected with the horizontal supporting frames, wherein each of the transversal supporting frames comprises a second receiving cavity; at least one elongated connectors embedded inside the first receiving cavity to connect two adjacent horizontal supporting frames; at least one L-shaped connectors embedded inside the first receiving cavity and the second receiving cavity to connect the transversal supporting frame and the horizontal supporting frame; at least one electrical wire connected with the elongated connectors and the L-shaped connectors; and a plurality of illuminating devices arranged on the horizontal supporting frames and the transversal supporting frames, and electrically connected with the electrical wire.

18 Claims, 10 Drawing Sheets

ILLUMINATED DISPLAY FRAME

FIELD OF THE DISCLOSURE

The present disclosure relates to a display frame, and more particularly to an illuminated display frame having at least one horizontal supporting frame, at least one transversal supporting frame, at least one connector configured to connect with horizontal supporting frame and the transversal supporting frame, and an electrical wire embedded inside the horizontal supporting frame and the transversal supporting frame to enhance the aesthetic effect thereof.

BACKGROUND OF THE DISCLOSURE

Generally, a display frame is a device for holding photographs or placing signs, such as outdoor and indoor sale signs or real estate signs, wherein the general display frame which is uprightly arranged and having a plurality of supporting frames connected with each other. First of all, the supporting frames are detachably connected to form a rectangular shape or square shape.

In addition, such a display frame further comprises a plurality for illuminating devices for lighting on the signs in order to attract the attention of shoppers or customers. Many conventional signs have their electrical circuits connected to an AC source, and however, the electrical wires are exposed and arranged outside the display frame to provide the illuminating effects. Certain display frames usually interfere with the viewing of the signs, and in addition, the electrical wires frequently fall down from the display frame, so it is easy for causing accidents, such as stumbling or the leakage of electricity.

Therefore, there may exist a high desire to develop a display frame providing the illuminating effects, and the electrical wires are not visual, and particularly are arranged inside the display frame to not only enhance the aesthetic effects but also prevent unexpected accidents happened.

All referenced patents, applications and literature are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY OF THE DISCLOSURE

In a general implementation, an illuminated display frame comprises at least one horizontal supporting frame, wherein each of the horizontal supporting frame comprises a first receiving cavity; at least one transversal supporting frame connected with the horizontal supporting frames, wherein each of the transversal supporting frames comprises a second receiving cavity; at least one elongated connector embedded inside the first receiving cavity to connect two adjacent horizontal supporting frames; at least one L-shaped connectors embedded inside the second receiving cavity to connect two adjacent transversal supporting frames; at least one electrical wire connected with the elongated connectors and the L-shaped connectors; and a plurality of illuminating devices arranged on the horizontal supporting frames and the transversal supporting frames, and electrically connected with the electrical wire.

In another aspect combinable with the general implementation, at least one of the elongated correctors is shaped to slidably inserted inside the first receiving cavity.

In another aspect combinable with the general implementation, at least one of the L-shaped connectors comprises a horizontal portion shaped to slidably insert inside the first receiving cavity, and a transversal portion shaped to slidably insert inside the second receiving cavity.

In another aspect combinable with the general implementation, at least one of the elongated connectors comprises a male elongated connector and an elongated female connector connected with the elongated male connector.

In another aspect combinable with the general implementation, at least one of the male elongated connector comprises a first portion having a retaining slot and a second portion having a protrusion being inserted into the retaining slot.

In another aspect combinable with the general implementation, at least one of the second portion has a male through hole where the electrical wire can pass therethrough.

In another aspect combinable with the general implementation, at least one of the elongated female connector comprises a female through hole where the electrical wire can pass therethrough.

In another aspect combinable with the general implementation, at least one of the each of the female elongated connectors comprises a filler disposed inside the female through hole to support the electrical wire disposed therein.

In another aspect combinable with the general implementation, at least one of the electrical wire has a male end and a female end connected with the male end, wherein the male end can pass through the male through hole of the elongated male connector, and the female end can be embedded inside the female through hole.

In another aspect combinable with the general implementation, at least one of the horizontal portion of the L-shaped connector comprises a first female through hole to receive the female end of the electrical wire, and the transversal portion of the L-shaped connector comprises a first male through hole to receive the male end of the electrical wire.

In an another general implementation, an illuminated display frame comprises at least two horizontal supporting frames, wherein each of the horizontal supporting frame comprises a first receiving cavity; at least two transversal supporting frames connected with the horizontal supporting frames, wherein each of the transversal supporting frames comprises a second receiving cavity; at least one elongated connectors embedded inside the first receiving cavity to connect two adjacent horizontal supporting frames; at least one L-shaped connectors embedded inside the second receiving cavity to connect two adjacent transversal supporting frames; at least one electrical wire connected with the elongated connectors and the L-shaped connectors; and a plurality of illuminating devices arranged on the horizontal supporting frames and the transversal supporting frames, and electrically connected with the electrical wire; wherein each of the elongated connectors comprises an opening slot for receiving the electrical wire being inserted therein.

In another aspect combinable with the another general implementation, at least one of the each of the elongated connectors comprises an elongated male connector and an elongated female connector connected with the elongated male connector.

In another aspect combinable with the another general implementation, at least one of the opening slot comprises a first opening slot located on the male elongated connector and a second opening slot located on the elongated female connector.

In another aspect combinable with the another general implementation, at least one of the electrical wire has a male end and a female end connected with the male end, wherein the male end can be inserted into the first opening slot, and the female end can be inserted into the second opening slot.

In another aspect combinable with the another general implementation, at least one of the horizontal portion of the L-shaped connector comprises a first female through hole to receive the female end of the electrical wire, and the transversal portion of the L-shaped connector comprises a first male through hole to receive the male end of the electrical wire.

In a yet another implementation, an illuminated display frame comprises at least two horizontal supporting frames, wherein each of the horizontal supporting frames comprises a first receiving cavity; at least two transversal supporting frames connected with the horizontal supporting frames, wherein each of the transversal supporting frames comprises a second receiving cavity; at least one elongated connectors embedded inside the first receiving cavity to connect two adjacent horizontal supporting frames; at least one L-shaped connectors embedded inside the second receiving cavity to connect two adjacent transversal supporting frames; at least one electrical wire connected with the elongated connectors and the L-shaped connectors; and a plurality of illuminating devices arranged on the horizontal supporting frames and the transversal supporting frames, and electrically connected with the electrical wire; wherein each of the elongated connectors comprises a through hole for receiving the electrical wire being inserted therein.

In another aspect combinable with the yet another general implementation, at least one of the elongated connectors comprises an elongated male connector and an elongated female connector connected with the elongated male connector.

In another aspect combinable with the yet another general implementation, at least one of the male elongated connector is one-piece, and the elongated female connector is one-piece.

In another aspect combinable with the yet another general implementation, at least one of the through hole comprises a male through hole arranged on the elongated male connector and a female through hole arranged on the elongated female connector.

In another aspect combinable with the yet another general implementation, at least one of the electrical wire has a male end and a female end connected with the male end, wherein the male end can pass through the male through hole, and the female end can pass through the female through hole.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above and below as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

Figure 1:
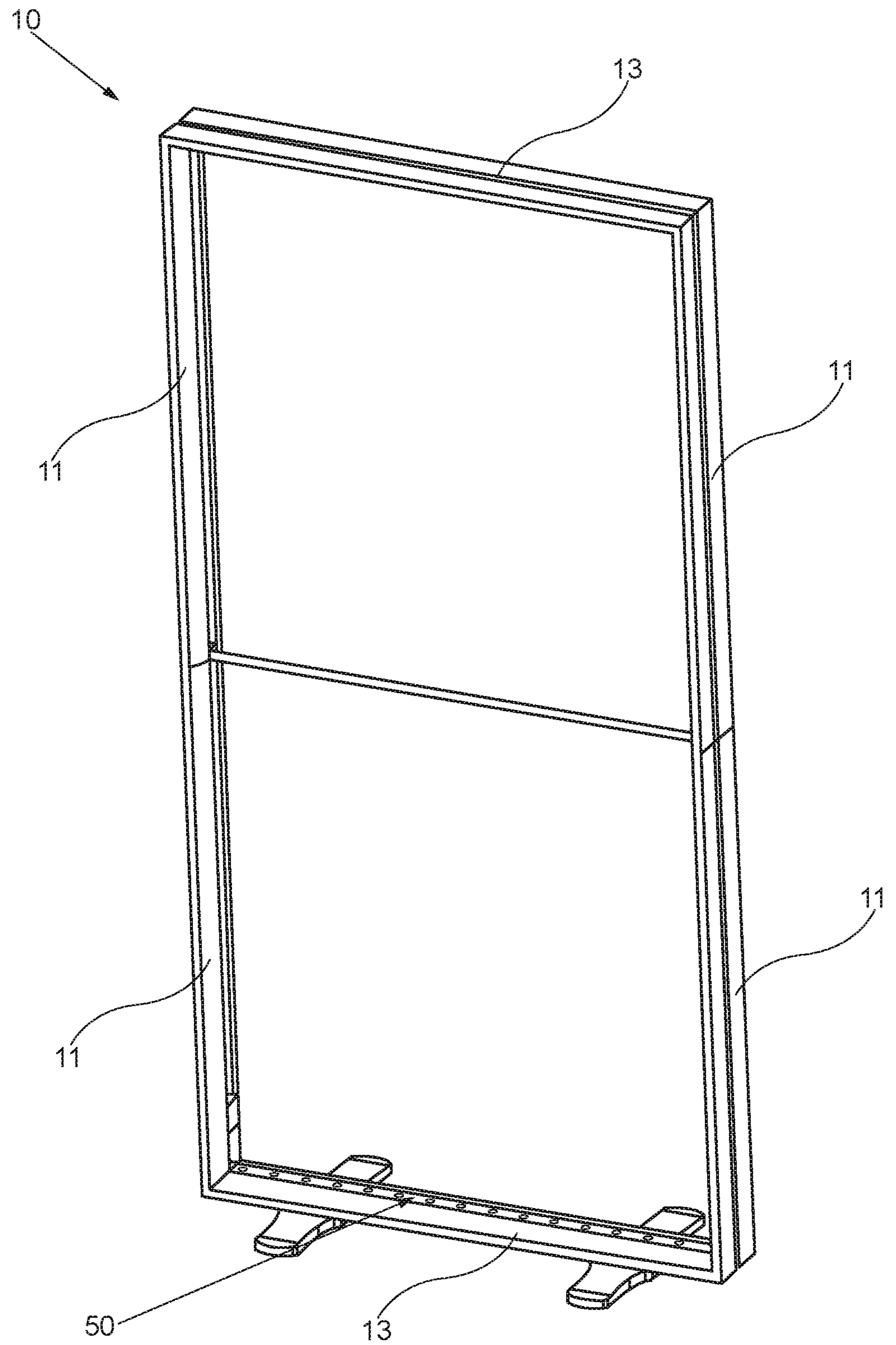
FIG. 1 is a perspective view of an illuminated display frame according to an aspect of the embodiment.
Figure 2:
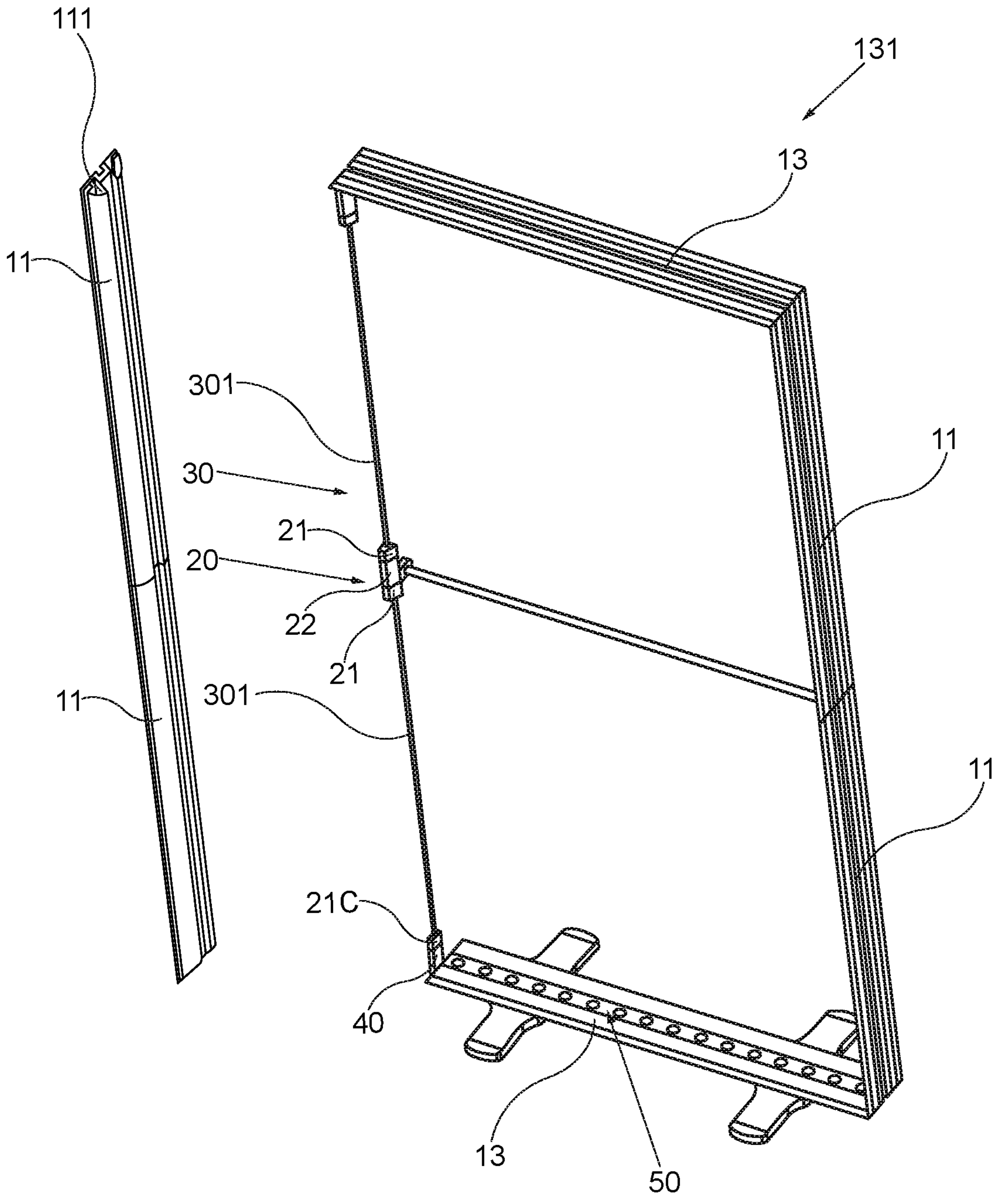
FIG. 2 is an exploded view of the illuminated display frame according to the aspect of the embodiment.

FIG. 1 generally depicts the basic architecture of an illuminated display frame 10 in accordance with the disclosed embodiment, and FIG. 2 generally depicts an exploded view of the illuminated display frame 10 in accordance with the disclosed embodiment.

The illuminated display frame 10 comprises at least one horizontal supporting frame 11, at least one transversal supporting frame 13 connected with the horizontal supporting frames 11, at least one elongated connector 20 configured to connect with two adjacent horizontal supporting frames 11, and at least one L-shaped connector 40 configured to connect with the horizontal supporting frame 11 and the transversal supporting frame 13, wherein one of the horizontal supporting frames 11 is vertically connected with one of the transversal supporting frames 13.

In one embodiment, two of the horizontal supporting frames 11 are head-to-head connected with two of the transversal supporting frames 13, wherein one of the two horizontal supporting frames 11 has a one end connected with one end of the other one of the two transversal supporting frames 13, and an opposite end of one of the two horizontal supporting frames 11 connected with one end of the other one of the two transversal supporting frames 13. In other words, the other one of the two horizontal supporting frames 13 has one end connected with the other end of the one of the two transversal supporting frames 13, and an opposite end of the other one of the two horizontal supporting frames 11 connected with the other end of the other one of the two transversal supporting frames 13. In one embodiment, a length of each of the horizontal supporting frames 11 is longer than a length of each of the transversal supporting frames 13, and two horizontal supporting frames 11 are connected with two transversal supporting frames 13 to form a rectangular-shaped of the illuminated display frame 10. And, the length of the two horizontal supporting frames 11 are equal, and the length of the two transversal supporting frames 13 are equal. Therefore, two horizontal supporting frames 11 are connected with two transversal supporting frames 13 to form a rectangular-shaped illuminated display frame of the present invention.

In another aspect, the lengths of the two horizontal supporting frames 11 is equal, and the lengths of two transversal supporting frames 13 is equal, wherein each of the length of the horizontal supporting frames 11 is equal to each of the length of the transversal supporting frames 13. Therefore, two of the horizontal supporting frames 11 can be connected with two of the transversal supporting frames 13 to form a square-shaped illuminated display frame 10.

In another embodiment, four of the horizontal supporting frames 11 are connected with two transversal supporting frames 13, wherein two of the four horizontal supporting frames 11 are connected with each other to form an elongated and straight configuration. In other words, one end of the one of the four horizontal supporting frames 11 is connected with one end of the other one of the four horizontal supporting frames 11 to form an elongated configuration. In addition, an opposite end of the one of the four horizontal supporting frames 11 is vertically connected with the one end of one of the two transversal supporting frames 13, and an opposite end of the other one of the four horizontal supporting frames 11 is vertically connected with the one end of the other one of the two transversal supporting frames 13. In other words, the rest two of the four horizontal supporting frames 11 are connected with each other to form the elongated straight configuration, wherein one end of one of the rest two horizontal supporting frames 11 is connected with one end of the other one of the rest two of the horizontal supporting frames 11. In addition, an opposite end of the one of the rest two horizontal supporting frames 11 is vertically connected with an opposite end of the one of the two transversal supporting frames 13, and an opposite end of the other one of the rest two horizontal supporting frames 11 is vertically connected with an opposite end of the other one of the two transversal supporting frames 13. Therefore, four horizontal supporting frames 11 are connected with the two transversal supporting frames 13 to form a rectangular-shaped illuminated display frame 10 of the present invention.

In yet another embodiment, the number of horizontal supporting frames 11 is predetermined in order to determine the height of the illuminated display frame 10 of the present invention. The more horizontal supporting frames 11 can be connected with each other to increase the height of the illuminated display frame 10. In addition, the number of the transversal supporting frames 13 is predetermined in order to determine the width of the illuminated display frame 10, wherein the more transversal supporting frames 13 can be connected with each other to increase the width of the illuminated display frame 10.

Accordingly, in another aspect, the length of the horizontal supporting frame 11 is different than the length of the transversal supporting frame 13. Therefore, at least two horizontal supporting frames 11 can be connected with at least two transversal supporting frames 13 to form a rectangular-shaped of the illuminated display frame 10 of the present invention.

Accordingly, the number of the horizontal supporting frames and the number of the transversal supporting frames are both even in order to form the square-shaped or rectangular-shaped illuminated display frame 10.

Each of the horizontal supporting frames 11 comprises a first receiving cavity 111 to receive the elongated connector 20, wherein the outer contour of the elongated connector 20 is shaped to engage with the first receiving cavity 111. In other words, the elongated connector 20 can be slidably inserted into the first receiving cavity 111.

Figure 9:
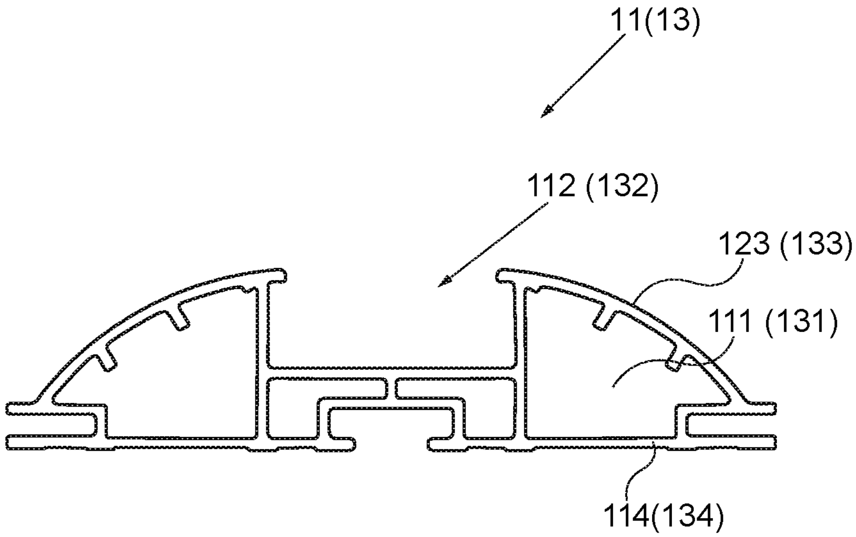
FIG. 9 is a sectional view of either the horizontal supporting frame or the transversal supporting frame.

As shown in FIG. 9, Each of the transversal supporting frames 13 comprises a second receiving cavity 131 to receive the L-shaped connector 40.

Referring to FIG. 2 of the drawings, the illuminated display frame 10 further comprises an electrical wire 30 connected with the elongated connector 20 and the L-shaped connector 40, and a plurality of illuminating devices 50 arranged on the horizontal supporting frames 11 or the transversal supporting frame 13, wherein the plurality of illuminating devices 50 are electrically connected with the electrical wire 30 to be charged thereby. In other words, the electrical wire 30 can be embedded inside the first receiving cavity 111.

Accordingly, the electrical wire 30 comprises a male end 301 and a female end 302, wherein the male end 301 can be electrically connected with the female end 302 to transfer electric current.

Figure 3A:
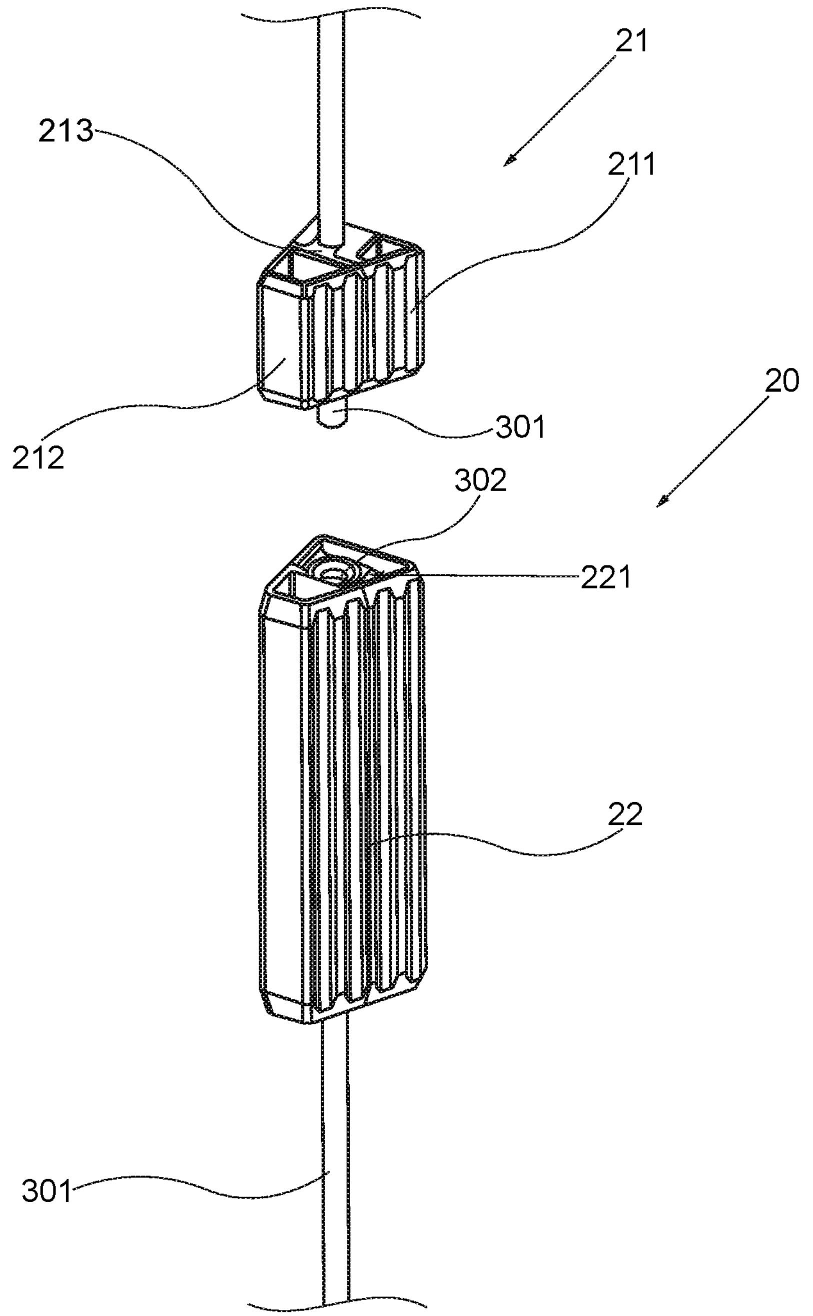
FIG. 3A is a perspective view of an elongated connector of the illuminated display frame according to the aspect of the embodiment.
Figure 3B:
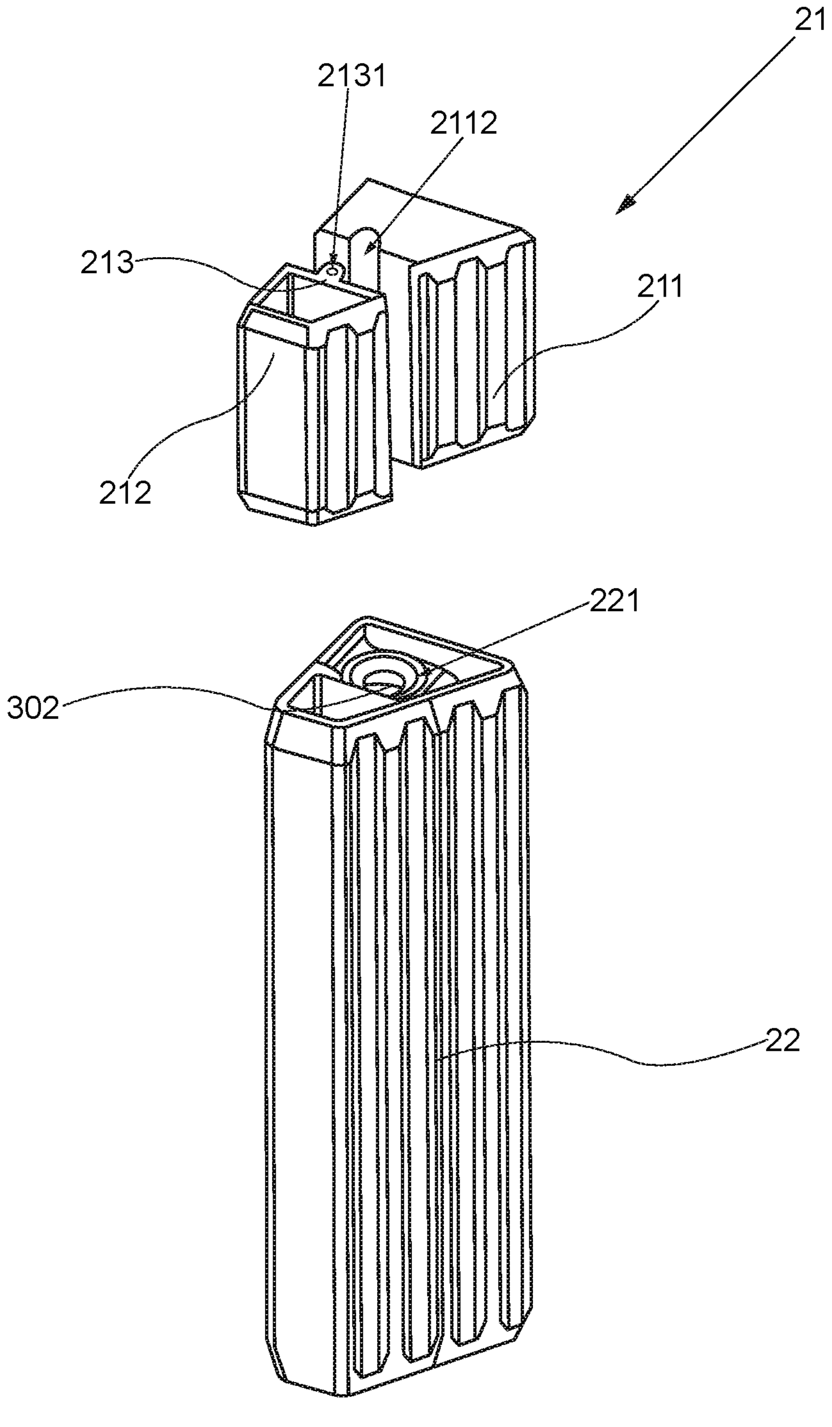
FIG. 3B is an exploded view of a male elongated connector of the elongated connector of the illuminated display frame according to the aspect of the embodiment.

FIG. 3A and FIG. 3B generally depicts the basic architecture of an elongated connector 20 in accordance with the disclosed embodiment. The elongated connector 20 comprises an male connector 21 and an elongated female connector 22 connected with the male connector 21, wherein the male connector 21 comprises a first portion 211 and a second portion 212 configured to connect with the first portion 211. The second portion 212 of the male connector 21 comprises a protrusion 213 having a male through hole 2131 for receiving the male end 301 of the electrical wire 30, and the first portion 211 of the male connector 21 comprises a retaining slot 2112 to engage with the protrusion 213 of the second portion 212.

Accordingly, the protrusion 213 of the second portion 212 can be squeezed into the retaining slot 2112 of the first portion 211 to form the male connector 21, wherein the contour of the male connector 21 is shaped to engage with the first receiving cavity 111.

The elongated female connector 22 comprises a female through hole 221 for receiving the female end 302 of the electrical wire 30, wherein the male connector 21 and the elongated female connector 22 are configured to be received in two separated-arranged and adjacent horizontal supporting frames 11 to connect that two adjacent horizontal supporting frames 11, and at the same time, the male end 301 of the electrical wire 30 can be received inside the male through hole 2131 of the male connector 21 and the female end 302 of the electrical wire 30 received inside the female through hole 221 of the elongated female connector 22, wherein the male end 301 and the female end 30 are electrically connected with each other.

In one aspect, the illuminated display frame 10 comprises a filler disposed inside the female through hole 221 to protect the female end 302 of the electrical wire 30, wherein the filler is disposed between the female end 302 of the electrical wire 30 and the female through hole 221 of the elongated female connector 22 to protect the female end 302 of the electrical wire 30 being scratched and deformed while the female end 302 of the electrical wire 30 is received into the elongated female connector 22.

Figure 4:
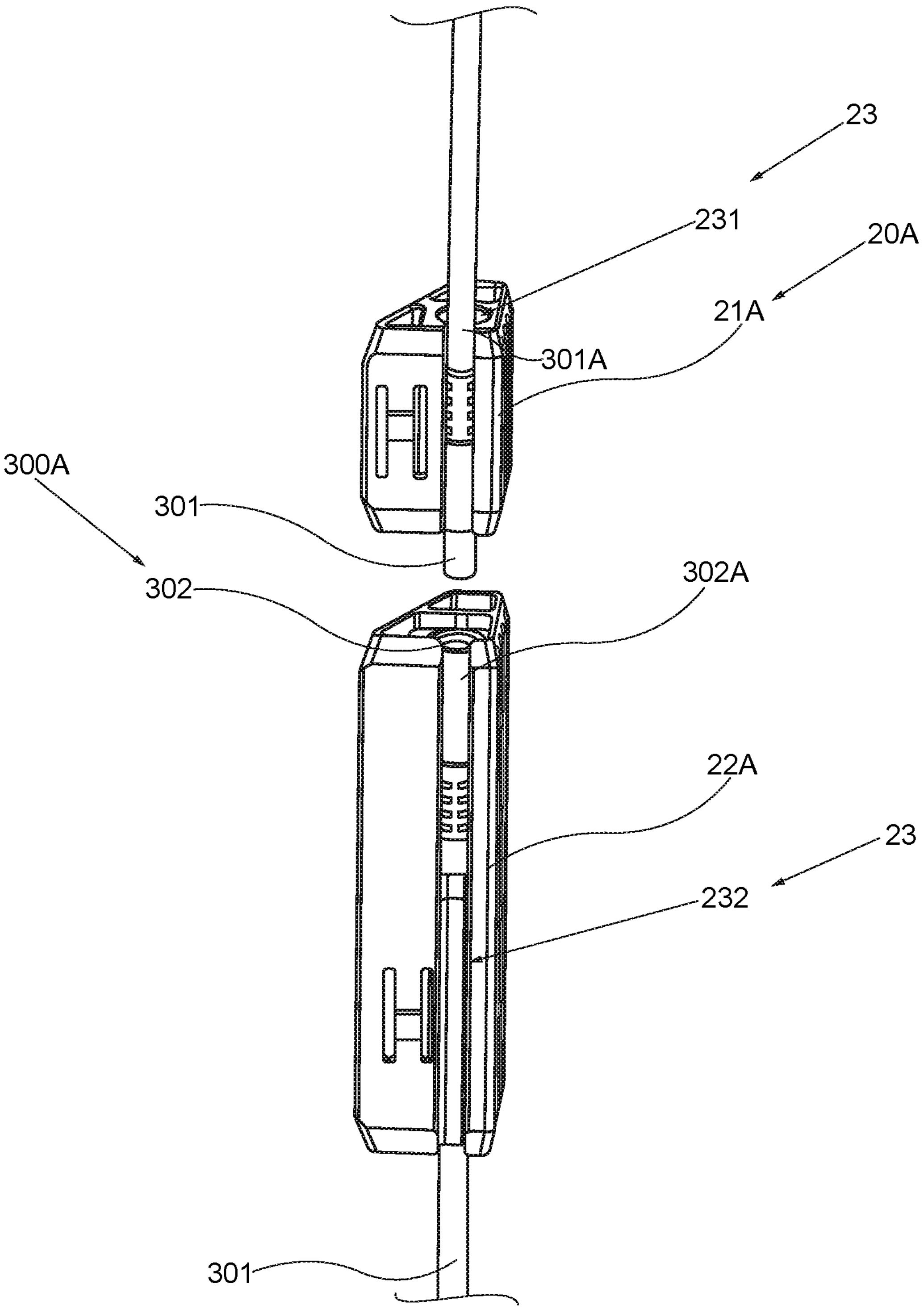
FIG. 4 is an alternative mode of the elongated connector according to the aspect of the embodiment.

FIG. 4 depicts an alternative mode of the elongated connector 20A, wherein the elongated connector 20A comprises an male connector 21A, an elongated female connector 22A configured to connect with the male connector 21A, an opening slot 23 for receiving the electrical wire 30, wherein the opening slot 23 comprises a first opening slot 231 located on the male connector 21A and a second opening slot 232 located on the elongated female connector 22A. The first opening slot 231 of the male connector 21A is configured to receive the male end 301 of the electrical wire 30, and the second opening slot 232 of the elongated female connector 22A is configured to receive the female end 302 of the electrical wire 30.

Accordingly, the alternative mode of the male connector 20A can be received inside the first receiving cavity 111 of the horizontal supporting frame 11, and the elongated female connector 23 can be received inside the first receiving cavity 111 of a corresponding horizontal supporting frame 11, wherein male connector 20A can be connected with the elongated female connector 22A to connect two adjacent horizontal supporting frames 11.

The alternative mode of male connector 21A and the alternative mode of elongated female connectors 22A both are a one-piece structure. In one aspect, the male end 301 of the electrical wire 30 is squeezed into the first opening slot 231 of the male connector 21A and the female end 302 of the electrical wire 30 is squeezed into the second opening slot 232 of the elongated female connector 22A, wherein first opening slot 231 is aligned with the second opening slot 232 to connect the male end 301 and the female end 302 of the electrical wire 30.

Figure 5:
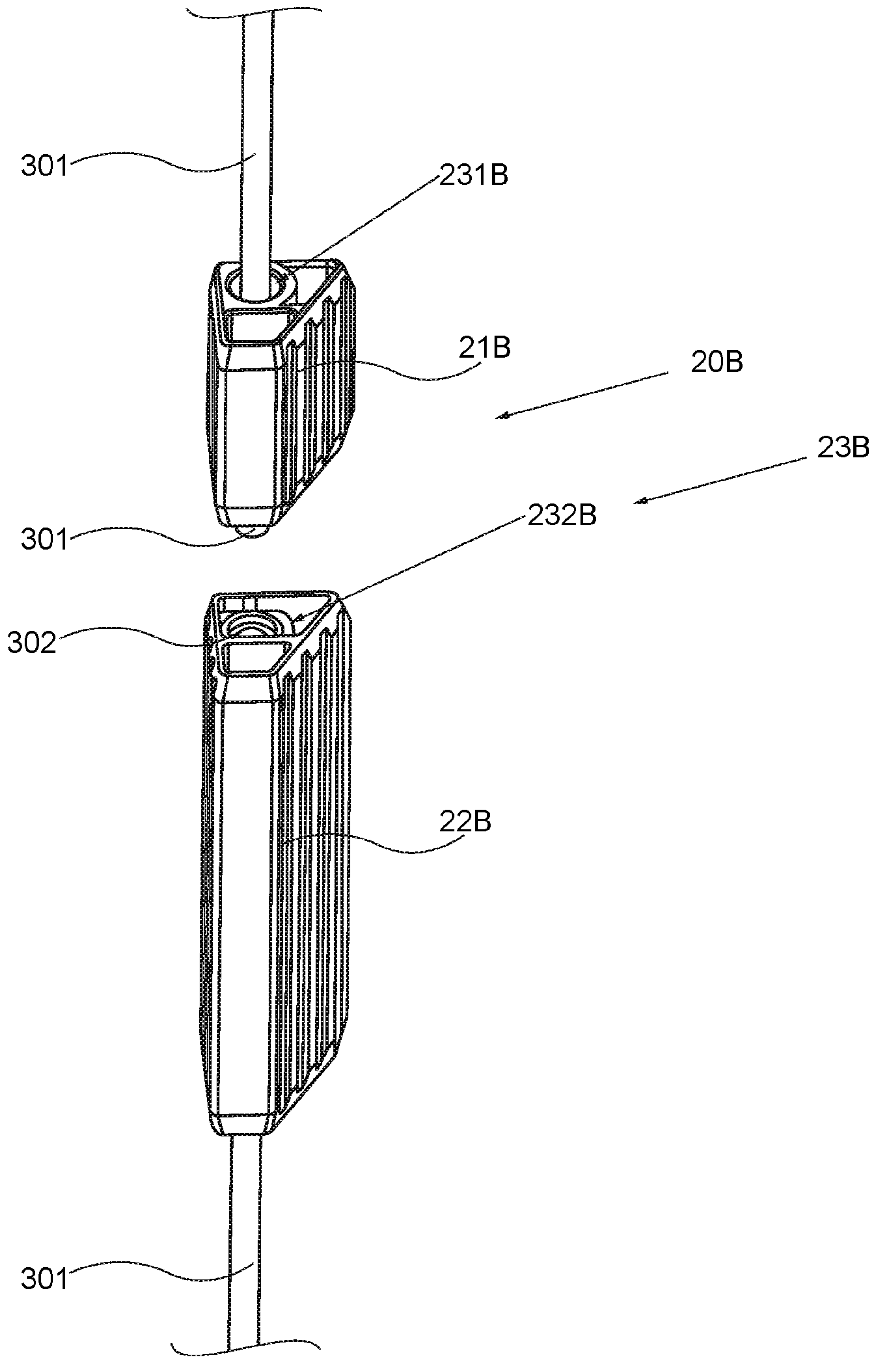
FIG. 5 is another alternative mode of the elongated connector according to the aspect of the embodiment.

FIG. 5 depicts an another alternative mode of the elongated connector 20B, wherein the elongated connector 20B comprises a male connector 21B, an elongated female connector 22B, and a through hole 23B for receiving the electrical wire 30, wherein the through hole 23B comprises a first through hole 231B located on the male connector 21B and a second through hole 231B located on the elongated female connector 22B. The male connector 21B and the elongated female connector 22B both have a one-piece structure. The second through hole 231B of the elongated female connector 22B is configured to receive the female end 302 of the electrical wire 30, and first through hole 231B of the male connector 21B is configured to receive the male end 301 of the electrical wire 30. The first through hole 231B of the male connector 21B is aligned with the second through hole 232B of the elongated female connector 22B in order to connect the male end 301 of the electrical wire 30 with the female end 302 of the electrical wire 30.

Accordingly, the another alternative mode of the male connector 21B can be received inside the first receiving cavity 111 of the horizontal supporting frame 11, and the alternative elongated female connector 22B can be received inside the first receiving cavity 111 of a corresponding horizontal supporting frame 11, wherein male connector 21B can be connected with the elongated female connector 22B to connect two adjacently arranged horizontal supporting frames 11.

Figure 6A:
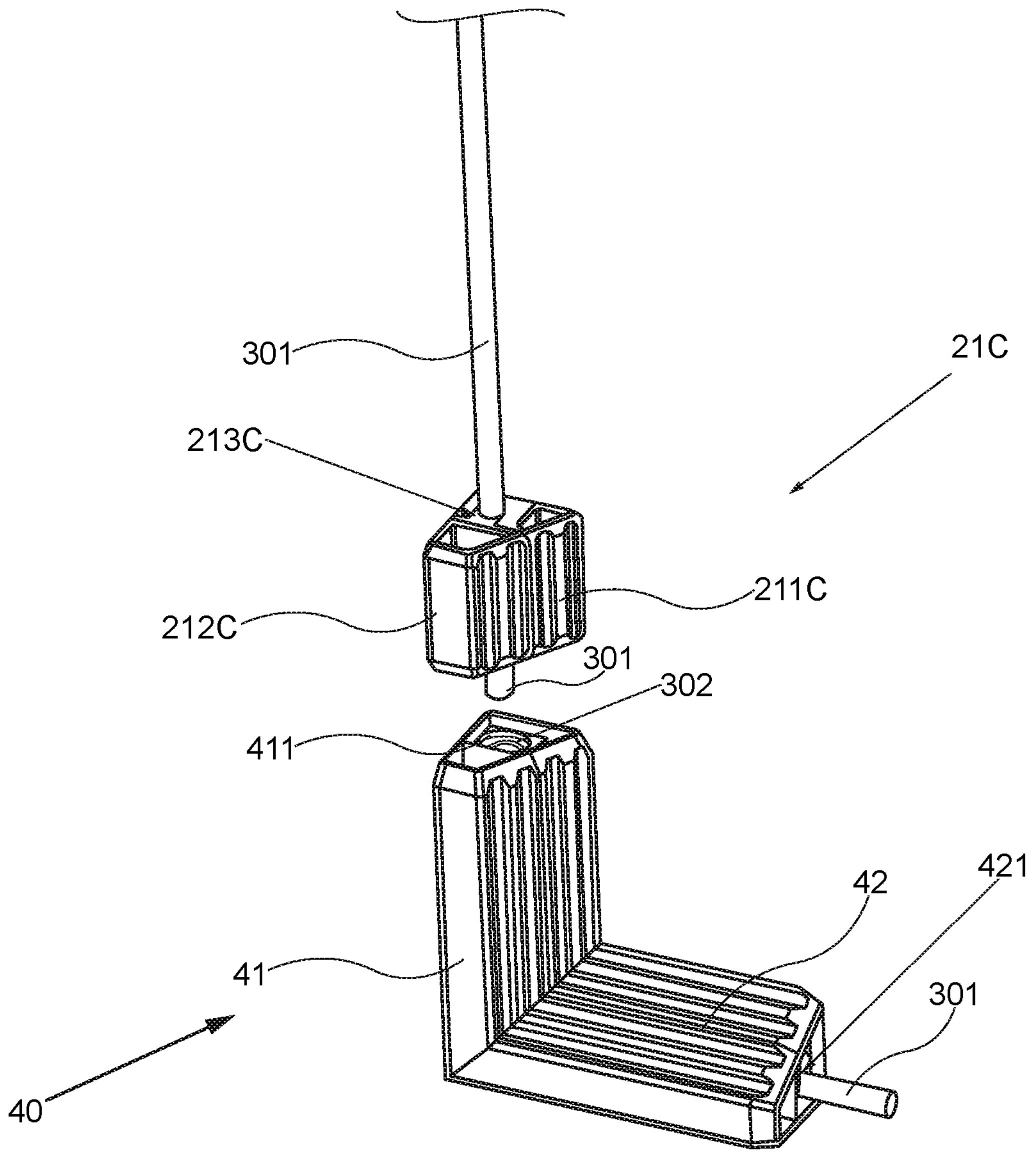
FIG. 6A is a perspective view of an L-shaped connector according to the aspect of the embodiment.
Figure 6B:
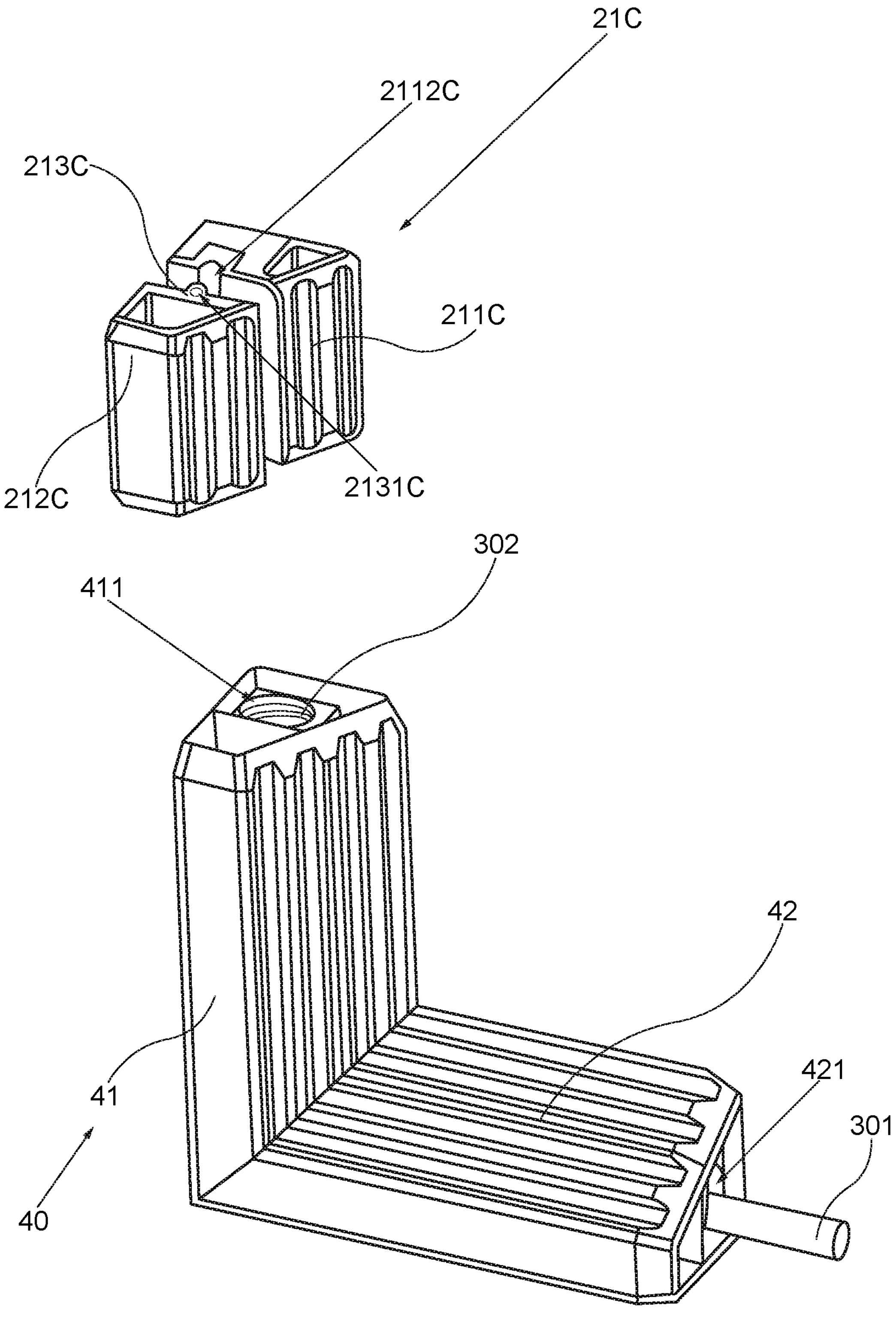
FIG. 6B is an exploded view of the L-shaped connector according to the aspect of the embodiment.

FIG. 6A and FIG. 6B depicts the basic architecture of the L-shaped connector 40 of the illuminated display frame 10 in accordance with the disclosed embodiment, wherein the L-shaped connector 40 comprises a horizontal female portion 41 and a transversal female portion 42 vertically extended from the horizontal female portion 41, wherein the horizontal female portion 41 comprises a horizontal female through hole 411 for receiving the female end 302 of the electrical wire 30. The transversal female portion 42 comprises a transversal female through hole 421 for receiving the male end 301 of the electrical wire 30, and the outer contour of the transversal female portion 42 is shaped to engage with the second receiving cavity 131 of the transversal supporting frame 13, and the outer counter of the horizontal female portion 41 is shaped to engage with the first receiving cavity 111 of the horizontal supporting frame 11.

Accordingly, the horizontal female portion 41 is configured to connect with the male connector 21C of the elongated connector 20, as shown in FIG. 3A and FIG. 3B, wherein the male connector 21C has the same structure as the male connector 21 of the elongated connector 20, as shown in FIG. 3A and FIG. 3B. The male connector 21C comprises a first portion 211C and a second portion 212C configured to connect with the first portion 211C. The second portion 212C of the male connector 21C comprises a protrusion 213C having a male through hole 2131C for receiving the male end 301 of the electrical wire 30, and the first portion 211C of the elongated male connector 21C comprises a retaining slot 2112C to engage with the protrusion 213C of the second portion 212*c*.

Accordingly, the protrusion 213C of the second portion 212C can be squeezed into the retaining slot 2112C of the first portion 211C to form the male connector 21C, wherein the contour of the male connector 21C is shaped to engage with the first receiving cavity 111.

In one aspect, the contour of the horizontal female portion 41 is shaped to engage with the first receiving cavity 111 of the horizontal supporting frame 11. Therefore, the L-shaped connector 40 is configured to connect with the horizontal supporting frame 11 and the transversal supporting frame 13, and the electrical wire 30 can be extended from the horizontal supporting frame 11 to the transversal supporting frame 13. Therefore, the electrical current can be transferred throughout the horizontal supporting frame 11 and the transversal supporting frame 13.

In another aspect, the illuminated display frame 10 comprises fillers disposed inside the horizontal female through hole 411, wherein the fillers are configured to protect the female end 302 of the electrical wire 30 being scratched and deformed.

Figure 7:
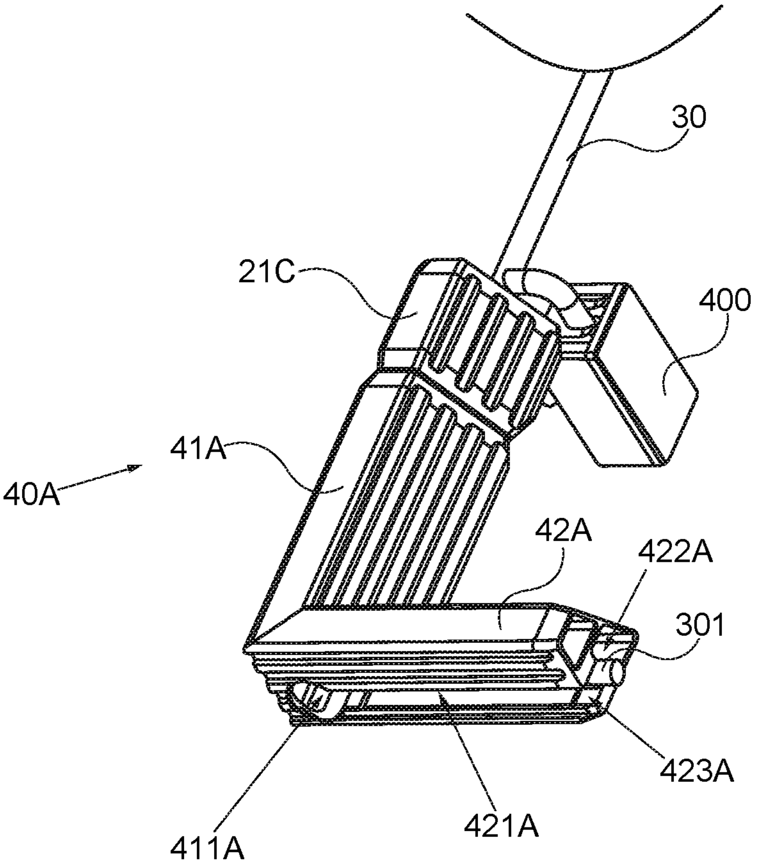
FIG. 7 is an alternative mode of the L-shaped connector according to the aspect of the embodiment.
Figure 8:
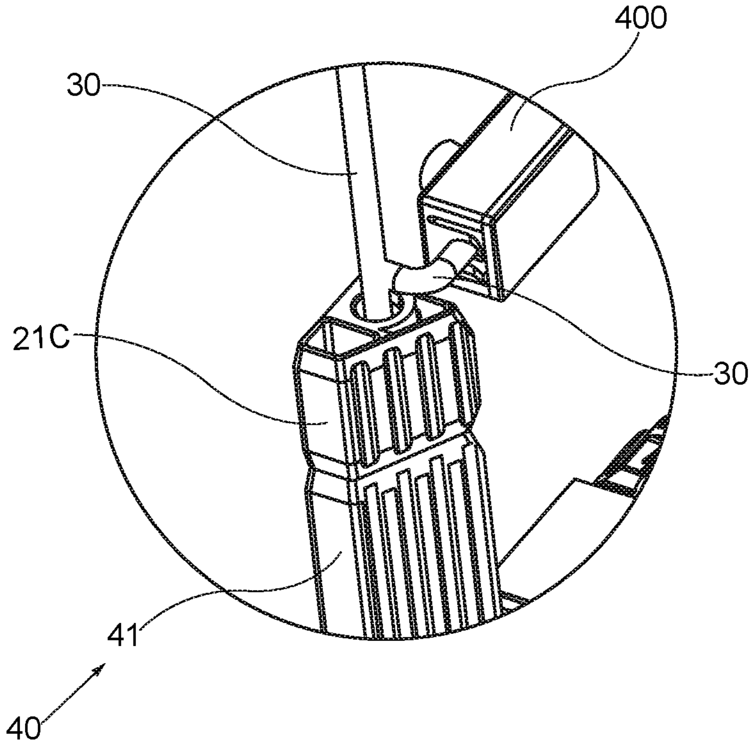
FIG. 8 is a sectional view of a connection between a power source and electrical wire, illuminating the power source being connected with either the elongated connector or the L-shaped connector.

FIG. 7 depicts an alternative mode of the L-shaped connector 40A. In this alternative mode, the L-shaped connector 40A comprises a horizontal female portion 41A, and a transversal female portion 42A vertically extended from the horizontal female portion 41A, wherein the horizontal female connector 41A comprises a first female through hole 411A for receiving the female end 302 of the electrical wire 30. The transversal female portion 42A comprises a transversal female opening slot 421A for receiving the male end 301 of the electrical wire 30, and the outer contour of the transversal female portion 42A is shaped to engage with the second receiving cavity 131 of the transversal supporting frame 13.

In one aspect, the male end 301 of the electrical wire 30 can be squeezed into the transversal female opening slot 421A of the transversal female portion 42A.

In another aspect, the contour of the horizontal female portion 41A is shaped to engage with the first receiving cavity 111 of the horizontal supporting frame 11. Therefore, the L-shaped connector 40A is configured to connect with the horizontal supporting frame 11 and the transversal supporting frame 13, and the electrical wire 30 can be extended from the horizontal supporting frame 11 to the transversal supporting frame 13. Therefore, the electrical current can be transferred throughout the horizontal supporting frames 11 and the transversal supporting frames 13.

As shown in FIG. 7, the illuminated display frame 10 further comprises a power source 400 electrically connected with the electrical wire 30 to provide the electrical current to the electrical wire 30.

Referring to FIG. 9 of the drawings, each of the horizontal supporting frames 11 and the transversal supporting frames 13 further comprises an illuminating receiving cavity 112 (132) respectively, wherein the illuminating devices 50 can be embedded inside the illuminating receiving cavity 112 (132) to provide the illuminating effects.

In one aspect, each of the horizontal supporting frames 11 and the transversal supporting frames 13 comprise a curved-shaped surface 123(133), wherein the curve-shaped surfaces 123(133) of the horizontal supporting frames 11 and the transversal supporting frames 13 are outwardly and laterally extended from two sides of the illuminating receiving cavity 112(132). The curved-shaped surfaces 123(133) are downwardly extended from the illuminating receiving cavity 112(132) towards a bottom surface 114(134) of each of the horizontal supporting frames 11 and the transversal supporting frames 13 respectively.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

Thus, specific embodiments and applications of the illuminated display frame have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

What is claimed is:

1. An illuminated display frame, comprising:

at least one horizontal supporting frame, wherein each of the horizontal supporting frames comprises a first receiving cavity;

at least one transversal supporting frame connected with the horizontal supporting frames, wherein each of the transversal supporting frames comprises a second receiving cavity;

at least one elongated connector embedded inside the first receiving cavity to connect two adjacent horizontal supporting frames;

at least one L-shaped connector embedded inside the first receiving cavity and second receiving cavity to connect the horizontal supporting frame and the transversal supporting frame;

at least one electrical wire connected with the elongated connectors and the L-shaped connectors; and a plurality of illuminating devices selectively arranged on the horizontal supporting frames or the transversal supporting frames, and electrically connected with the electrical wire;

wherein each of the elongated connectors comprises a male connector and an elongated female connector connected with the elongated male connector.

2. The illuminated display frame, as recited in claim 1, wherein each of the elongated connectors is shaped to be inserted inside the first receiving cavity.

3. The illuminated display frame, as recited in claim 1, wherein each of the L-shaped connectors comprises a horizontal portion shaped to insert into the first receiving cavity, and a transversal portion shaped to insert into the second receiving cavity.

4. The illuminated display frame, as recited in claim 1, wherein the male connector comprises a first portion having a retaining slot and a second portion having a protrusion being inserted into the retaining slot.

5. The illuminated display frame, as recited in claim 4, wherein the second portion has a male through hole where the electrical wire can pass therethrough.

6. The illuminated display frame, as recited in claim 5, wherein the elongated female connector comprises a female through hole where the electrical wire can pass therethrough.

7. The illuminated display frame, as recited in claim 6, wherein the electrical wire has a male end and a female end connected with the male end, wherein the male end can pass through the male through hole of the elongated male connector, and the female end can be embedded inside the female through hole.

8. The illuminated display frame, as recited in claim 7, wherein the horizontal portion of the L-shaped connector comprises a first female through hole to receive the female end of the electrical wire, and the transversal portion of the L-shaped connector comprises a first male through hole to receive the male end of the electrical wire.

9. An illuminated display frame, comprising:

at least one horizontal supporting, frame, wherein each of the horizontal supporting frames comprises a first receiving cavity;

at least one transversal supporting frame connected with the horizontal supporting frames, wherein each of the transversal supporting frames comprises a second receiving cavity;

at least one elongated connector embedded inside the first receiving cavity to connect two adjacent horizontal supporting frames;

at least one L-shaped connector embedded inside the second receiving cavity and the first receiving cavity to connect the transversal supporting frame and the horizontal supporting frame;

at least one electrical wire connected with the elongated connectors and the L-shaped connectors; and a plurality of illuminating devices selectively arranged on the horizontal supporting frames or the transversal supporting frames, and electrically connected with the electrical wire; wherein each of the elongated connectors comprises an opening slot for receiving the electrical wire being inserted therein.

10. The illuminated display frame, as recited in claim 9, wherein each of the elongated connectors comprises a male connector and an elongated female connector connected with the male connector.

11. The illuminated display frame, as recited in claim 10, wherein the opening slot comprises a first opening slot located on the male connector and a second opening slot located on the elongated female connector.

12. The illuminated display frame, as recited in claim 11, wherein the electrical wire has a male end and a female end connected with the male end, wherein the male end can be inserted into the first opening slot, and the female end can be inserted into the second opening slot.

13. The illuminated display frame, as recited in claim 12, wherein the horizontal portion of the IL-shaped connector comprises a first female through hole to receive the female end of the electrical wire, and the transversal portion of the L-shaped connector comprises a first male through hole to receive the male end of the electrical wire.

14. An illuminated display frame, comprising:

at least one horizontal supporting frame, wherein each of the horizontal supporting frames comprises a first receiving cavity;

at least one transversal supporting frame connected with the horizontal supporting frames, wherein each of the transversal supporting frames comprises a second receiving cavity;

at east one elongated connectors embedded inside the first receiving cavity to connect two adjacent horizontal supporting frames;

at least one L-shaped connectors embedded inside the first receiving cavity and the second receiving cavity to connect the horizontal supporting frame and the transversal supporting frame;

at least one electrical wire connected with the elongated connectors and the L-shaped connectors; and a plurality of illuminating devices arranged on the horizontal supporting frames and the transversal supporting frames, and electrically connected with the electrical wire; wherein each of the elongated connectors comprises a through hole for receiving the electrical wire being passed therethrough.

15. The illuminated display frame, as recited in claim 14, wherein each of the elongated connectors comprises a male connector and an elongated female connector connected with the elongated male connector.

16. The illuminated display frame, as recited in claim 15, wherein the male connector has a one-piece structure, and the elongated female connector has a one-piece structure.

17. The illuminated display frame, as recited in claim 16, wherein the through hole comprises a male through hole arranged on the male connector and a female through hole arranged on the elongated female connector.

18. The illuminated display frame, as recited in claim 17, wherein the electrical wire has a male end and a female end connected with the male end, wherein the male end can pass through the male through hole, and the female end can pass through the female through hole.

* * * * *